United States Patent [19]
Drake et al.

[11] 3,846,759
[45] Nov. 5, 1974

[54] DATA PROCESSING ARRANGEMENTS

[75] Inventors: John Alfred Drake; Alan James Payne, both of Biggleswade; Andrew Ronald Reichert, Stevenage, all of England

[73] Assignee: International Computer Limited, London, England

[22] Filed: July 24, 1972

[21] Appl. No.: 274,703

[30] Foreign Application Priority Data

July 23, 1971 Great Britain .................... 34604/71

[52] U.S. Cl. .............................................. 340/172.5
[51] Int. Cl. .............................................. G06f 9/00
[58] Field of Search................ 340/172.5; 235/151.1

[56] References Cited

UNITED STATES PATENTS

| | | | |
|---|---|---|---|
| 3,061,192 | 10/1962 | Terzian | 340/172.5 |
| 3,432,813 | 3/1969 | Annunziata et al | 340/172.5 |
| 3,543,245 | 11/1970 | Nutter | 340/172.5 |
| 3,657,705 | 4/1972 | Mekota et al | 340/172.5 |
| 3,753,243 | 8/1973 | Ricketts, Jr. et al | 340/172.5 |

*Primary Examiner*—Paul J. Henon
*Assistant Examiner*—Michael Sachs
*Attorney, Agent, or Firm*—Misegades, Douglas & Levy

[57] ABSTRACT

A data processor is described particularly suited to provide a universal link between a peripheral mechanism and a central computer. The arrangement provides, in addition to an input selection and masking unit and a selective masking output unit, a processing unit for performing logic operations on input information relating to, e.g., incoming and status signals relating to the associated peripheral mechanism in order to derive an output signal pattern for controlling the actuation of the peripheral. In order to carry out a program of stored instructions, each of which specifies a function to be performed, it is frequently necessary that data resulting from the performance of preceding functions is required to undergo processing, for example, comparison with, or modification in the light of, a second item of data. A double set of registers is provided and the processing unit is able, under control of some functional instructions to address a single register in each set so that the contents of both addressed registers are rendered available concurrently on a single program step. There is also provision for using one of the specified addresses as the destination for the result of the prescribed function.

2 Claims, 3 Drawing Figures

DATA PROCESSING ARRANGEMENTS

BACKGROUND OF THE INVENTION

1. Field of the Invention

The invention relates to data processors responsive to stored programs for performing logic operations on data items.

2. Description of the Prior Art

Where, in data processing arrangements, it has previously been proposed to perform processing operations involving more than one item of data it has usually been the practice to marshall the items each into an appropriate one of a group of predetermined single operational registers by a first set of program instructions and then to perform, as a separate program step, the prescribed operation with the contents of these registers, the routing of the items to a logic unit always following a predetermined pattern in dependence upon the logic operation instruction. This process involves that additional time required for the preliminary assembly of the individual data items into the appropriate registers before the operational instruction can be entered into the arrangement.

SUMMARY OF THE INVENTION

According to the invention, a stored program controlled data processor has a decision making unit that is operable on two data words together, which words are provided from separate sources each including a different set of data word locations. This can be achieved by addressing both sets with the different parts of the same instruction word, when it is convenient for the word location or register designated by one of those parts to serve also as the destination for the output of the decision making unit.

Such operation permits a particularly fast cycle time for operations, such as comparison and addition, combinatively involving two data words. Each of the sources may include a multiplexor, with each multiplexor connected to receive, as one of its inputs, the word output from a different one of the sets of words locations or registers. Other inputs of the multiplexor may be suitably connected to receive reference words or other data words.

CROSS REFERENCE TO RELATED APPLICATION

Embodiments of the invention are particularly well suited to use as the processing units of arrangements disclosed in our co-pending application Ser. No. 274,831 of even data and assigned to the same Assignee, which relates to input/output control using masking techniques. These arrangements are useful as peripheral mechanism controllers applicable to different peripheral machines according to the stored program and communicating with the intimate electronics of the mechanism concerned.

BRIEF DESCRIPTION OF THE DRAWING

One embodiment of the invention will now be particularly described, by way of example, with reference to the accompanying drawings which show, schematically, structural and operational features of apparatus able to function as a peripheral mechanism controller. In particular.

DESCRIPTION OF PREFERRED EMBODIMENTS

Figure 2:
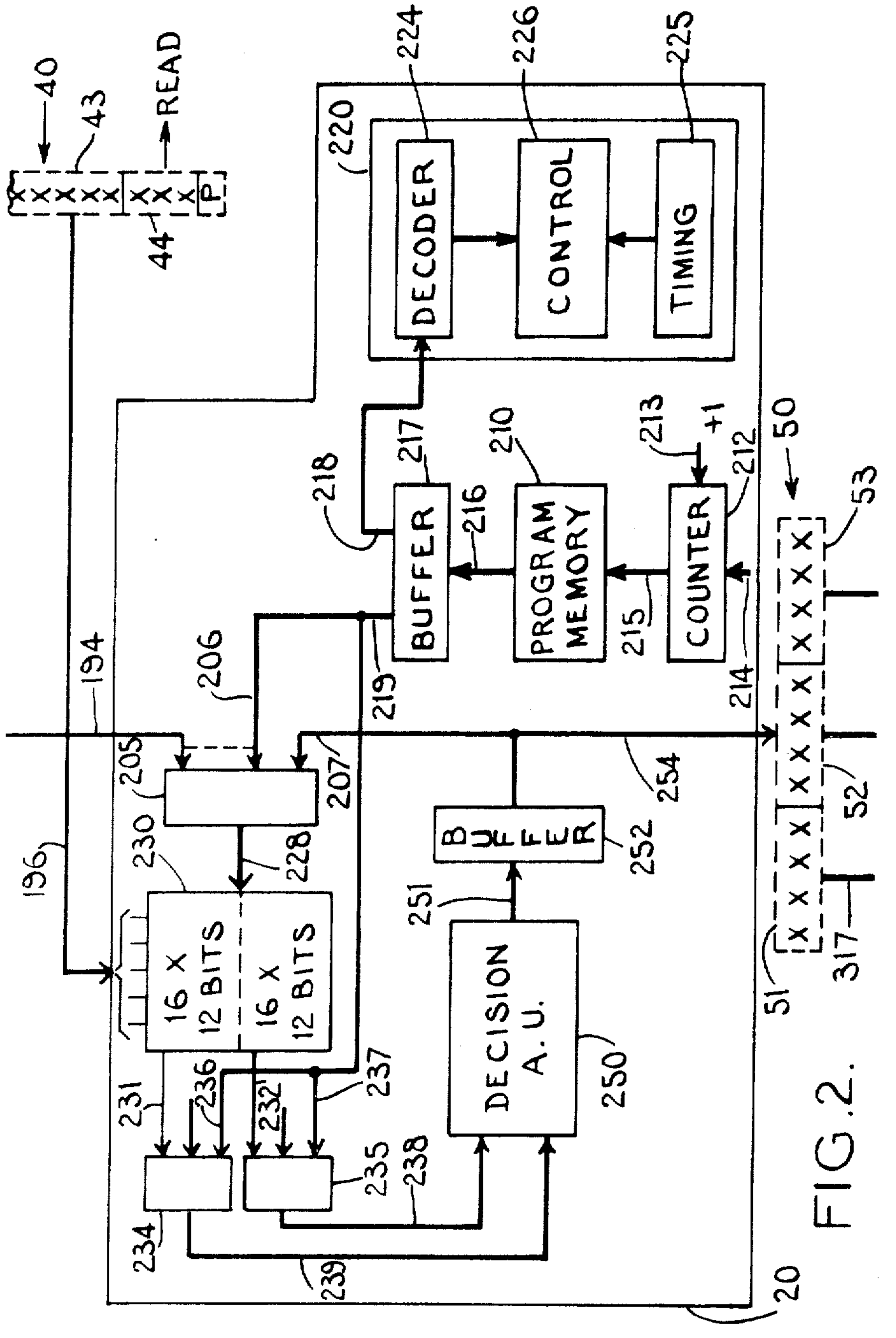
FIG. 2, shows the processing arrangement.
Figure 3:
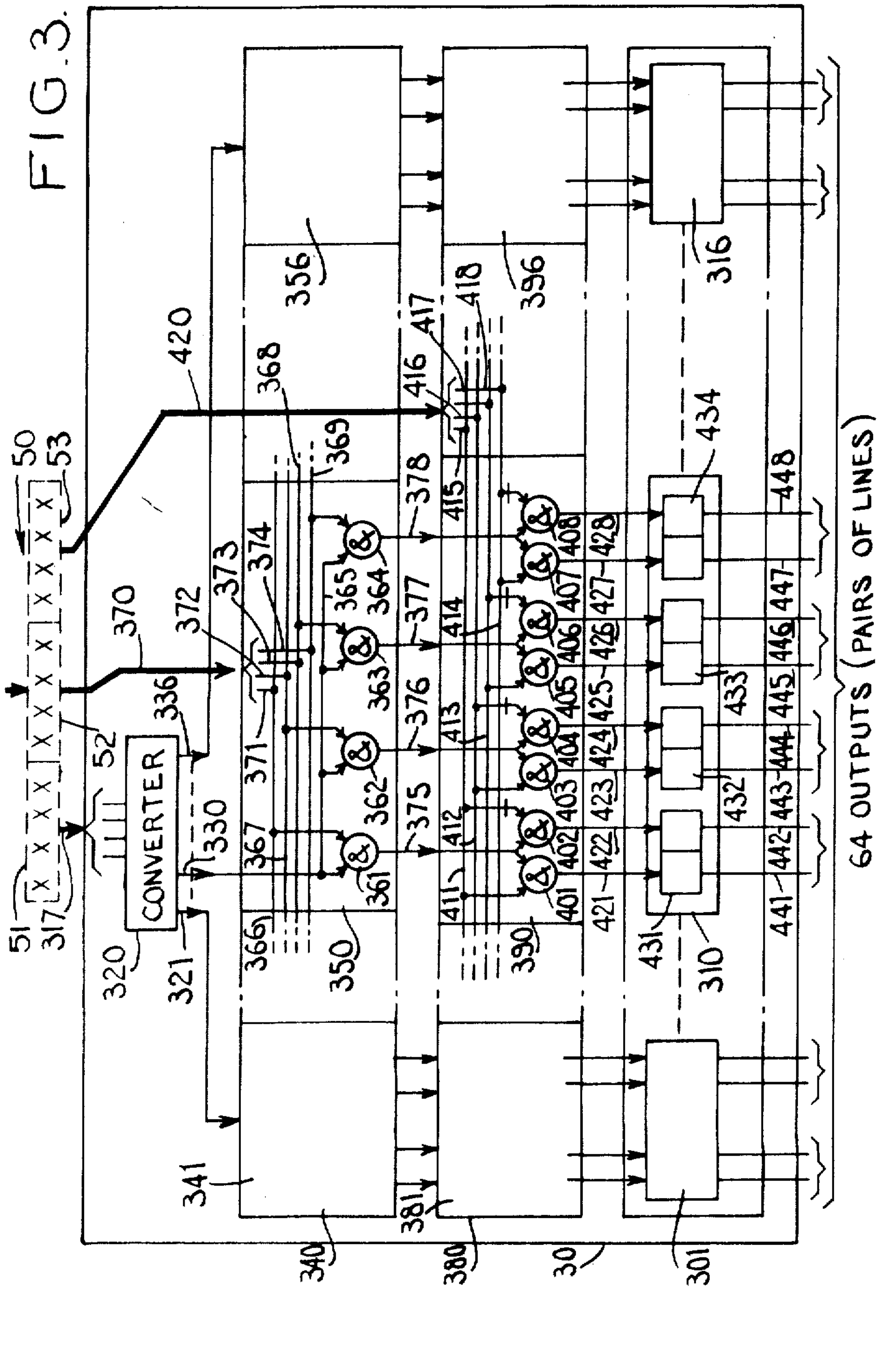
FIG. 3. shows the output arrangement.

Structurally, the illustrated apparatus comprises three basic blocks, namely, input multiplexing and masking block 10 (FIG. 1), processing block 20 (FIG. 2), and output selection and masking block 30 (FIG. 3).

In the input block 10 (FIG. 1), 96 inputs are indicated They are divided into eight predetermined blocks of 12 inputs each. This is done using 12 eight-input multiplexors 101 to 112 each having three selection lines S1, S2, S3. Each multiplexor will provide at its output a different one of the inputs as specified by a binary word corresponding to the energisation pattern of the selection lines. The same selection line energisation pattern is applied from cable 114 simultaneously to all of the multiplexors 101 to 112, thereby selecting at the multiplexor outputs a 12 input group unique to the energisation pattern. The disposition of multiplexors is collectively referred to as a group selector 120 having outputs 121 to 132 from the multiplexors 101 to 112 respectively. Only the multiplexors 101 and 112, and the multiplexor outputs 121, 122, 131, 132, are specifically shown. The presence of the others is indicated by dashes and similar techniques are used elsewhere in the drawings.

It will be appreciated that the selection word cable 114 is actually provided from a register into which an instruction from an operating program may be entered. As will be described later instruction words are acutally derived from the processing block 20 (FIG. 2). However, it is convenient at this point, for the purposes of explanation to regard the cable 114 as being derived from a three bit field 41 of the order part of an instruction word 40. The instruction word 40 is shown as having a 12-bit order part 41, 43, 44 with each bit position indicated by e.g., a cross. The instruction word 40 also has a data part 42 shown without specific bit position indications. This data part 42 is used in a masking operation relative to the outputs 121 to 132 of the group selector 120 in a masking circuit 140 to be described.

The masking circuit 140 comprises twelve AND gates 141 to 152 each having a first input connected to a different one of of the multiplexor outputs 121 to 132, respectively, and a second input connected over lines 161 to 172, respectively, to be energised by different bits of the data part of the associated instruction word. This in indicated functionally by the cable 174 extending from the data part 42 of the instruction word 40.

The energisation of the second inputs of the AND gates 141 to 152 as just described, serves to enable selected ones of the multiplexor outputs 121 to 132. Those outputs that are not enabled will, in effect, present a predetermined one of the binary values on corresponding ones of AND gate outputs 181 to 192 regardless of the actual energisation of the multiplexor outputs. It will be clear that this type of input masking operation can be carried out equally well by enabling or disabling operation of appropriate ones of the multiplexors 101 to 112.

Figure 1:
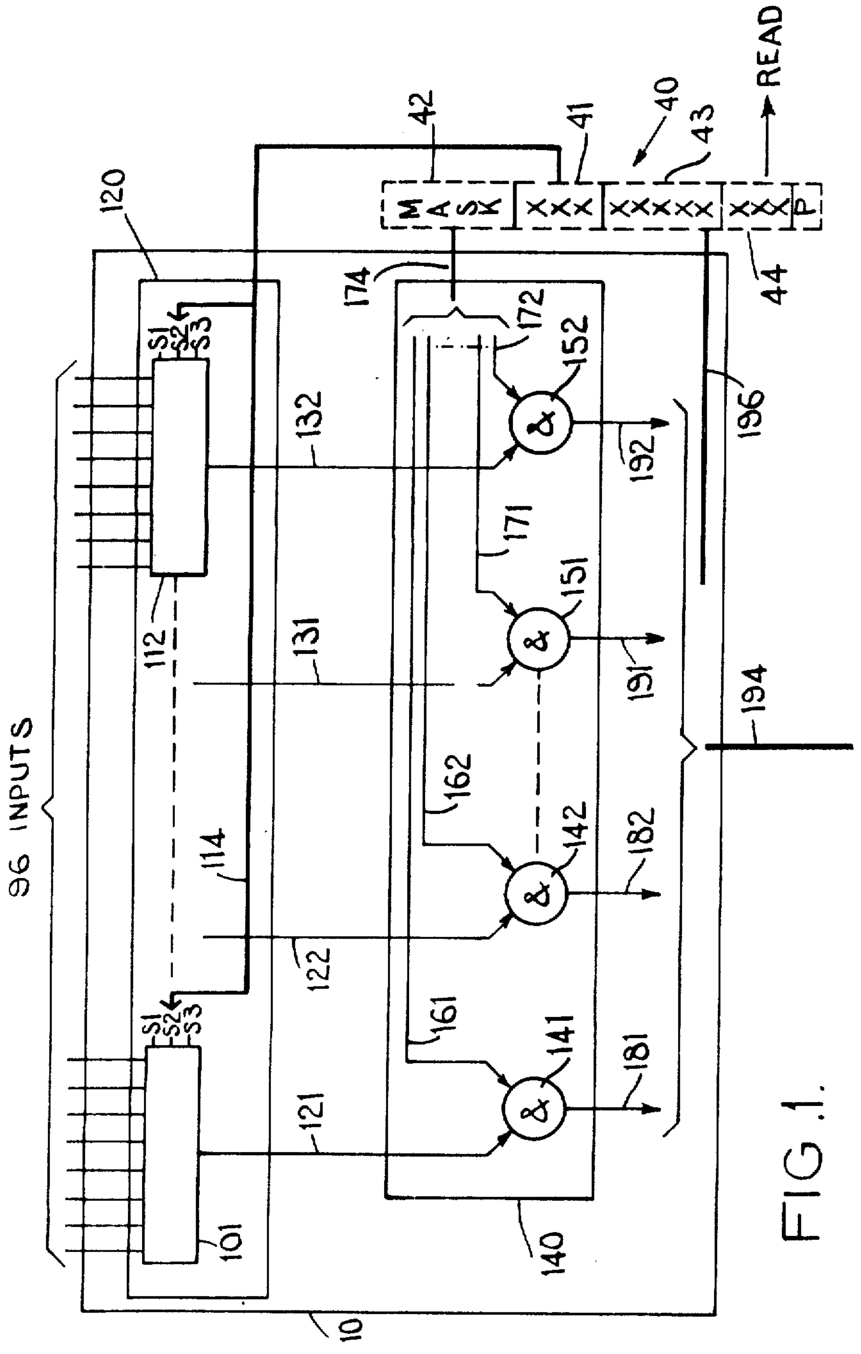
FIG. 1, shows the input arrangement.

The masked input group word is therefor present on lines 181 to 192 and is shown in FIG. 1 as leaving the input block 10 on cable 194. Thus, an instruction word 40 can select, by order part 41, any one of eight distinct 12-bit input words representing predetermined groupings of the 96 inputs to the multiplexors 101 to 112. Furthermore, by data part 42, the instruction word can also select any combination of the 12-bits bits of the chosen input word in a masking operation serving to ensure that all unselected bits are put to a predetermined binary value. The cable 194 transfers the output from the block 10 (FIG. 1) to the processing block 20 (FIG. 2). For convenience the fields 43 and 44 of the instruction word 40 are repeated in FIG. 2. The field 43 is shown to have five bits, which, in the present embodiment, serve to define an address to which the masked input word is to be sent. This addressing is performed via a five line cable 196 normally controlled from within the processor block 20. The third order field 44 includes a parity bit P, and the remaining three bits define a function according to their values. In this case the values represent a masked read operation relative to the inputs to the block 10.

In the processor block 20, the masked input word available on the 12-line cable 194 is shown extending to an input of a multiplexor 205 having further inputs of which two 12-line cables 206 and 207 are shown. The processor includes a program memory 210 for storing instruction words completely specifying control functions for a peripheral machine which provides certain information (inputs on FIG. 2) in response to which various energisations or variations therein are required (outputs on FIG. 3) as a response. The program memory 210 may be a read only memory some or all of which will be replaced for controlling different machines. Alternatively, of course, a read/write memory may be used with a write facility provided for replacing the contents of the memory.

The program memory 210 is shown, conventionally, in a sequentially addressed configuration utilising and addressing counter 212 that is normally incremented by unity via lead 213 for each processor cycle. The output 215 of the counter 212 addresses the program memory 210. A multi-line input is shown to the counter 112 for program jumps.

The program memory is organised on a 24-bit word basis and will thus normally provide words similar to the instruction word shown at 40 on its output 216 which is taken to a buffer 217. The buffer 217 is shown with separate outputs 218 and 219 for the order and data parts respectively of an instruction word. The output cable 218 is shown extending to a control arrangement 220 and the output cable 219 is shown connected to the input 206 of multiplexor 205. The control arrangement 220 is shown to include an instruction decoder 224, timing circuits 225, and control circuits 226 which are operative to perform the various routing connections and function initiations required by instruction words.

As previously noted the instruction word 40 shown diagrammatically in FIG. 1 and FIG. 2 is actually derived from the program memory and in practice the buffer 217 forms a convenient register in which the word 40 would actually be available. Thus, it will be realised that the cables 114, 174 and 196 shown in these figures are actually provided from the buffer 217, or the sake of clarity in description, however, it is preferred to show an exemplary representation of the word 40 in order to demonstrate the manner in which it is made up from varous parts or fields 41, 42, 43 and 44. It is also to be realised that the function field 44 is the field whose contents are in practice, passed through the decoder 224 to the control arrangement 220. Thus, the function which is required to be carried out is specified in the field 44, is decoded by the decoder 224 in the conventional manner and is passed to the control arrangement 226 which is arranged, again in the conventional manner, to generate control signals to provide appropriate gating connections and energising signals to the remaining elements of the processor block 20 to enable this block to carry out the processing operation specified by the instruction. The timing circuits 225 provide a sequence of timing signals to enable the passage of data between these various elements. The organisation of a processing control and timing arrangement for a logic unit making up a control processing unit for a computer is well known in the art, and the multiplicity of control lines provided in practice to interlink the elements of the processing block 20 are therefore omitted from the Figure for the sake of clarity.

The particular arrangement of registers of read/write storage and multiplexing to be described for the processing unit has certain advantages by way of permitting on one function, the use of two data sources and one destination.

The multiplexor 205 will, in practice, comprise twelve simultaneously operable units each concerned with a different bit. The output cable 228 extends to a twelve-bit word organised memory 230 which takes the form of two separate sets of sixteen word addresses or registers. Gating to the registers from the line 228 is controlled by the five bits on cable 196. At least when a masked input is concerned, the cable 196 can be energised according to the order part, field 43, of the instruction word 40.

Each set of registers has a 12 line output cable 231 and 232, connected to inputs of multiplexors 234 and 235 respectively, each similar to the multiplexor 205. These multiplexors 234 and 235 have other inputs 236 and 237 connected to the memory buffer data output 219. Further inputs would serve to provide predetermined input patterns, such as all-ones or all zeros which it is generally convenient for the control arrangement 220 to be able to provide. Inputs for at least two such patterns would normally be provided, through only one is shown.

The multiplexors 235 and 234 supply outputs 238 and 239 respectively. These outputs are connected to an arithmetic unit 250 for making decisions basically by comparison and addition operations. Provision will also normally be made for the incorporation of units for accomplishing shifting and carry and error checking operations with appropriate multiplexing to the register 230 and/or the inputs of the multiplexors 234 and 235 and/or otherwise to the inputs of the arithmetic unit 250. The particular arrangement shown allows operations to take place between the outputs of the multiplexors 234 and 235. In general, this arrangement permits very fast operation without greatly affecting flexibility. There is a requirement, if speed is not to be sacrificed, for care in setting up the stored programs to avoid finding that two items of data are in the same set of registers when they are to be combinatively operated upon in the decision unit 250. In practice this is not found to be particularly restricting or unduly onerous.

The output of the decision arthimetic unit 250 feeds a buffer 252 which gives, on cable 254, the output of the processing block 20. This output 254 is tapped to provide a further input to the multiplexor 205. It is convenient for input to the program address counter 212 on cable 214 for program jumps to be taken from the output 228 of the multiplexor 205.

The two multiplexors 234 and 235 constitute separate sources of data and, on certain functions instruction words, will simultaneously supply the decision unit 250. A corresponding 24-bit instruction word from the program memory 210 can specify that both multiplexors 234 and 235 pass a register output, i.e., select their inputs 231 and 232. In such a case, separate fields of that instruction word will address a register in each set thereof. It is convenient, then, for one of those addressed registers also to serve as the destination for the results of the specified function as available from the buffer 252.

These arrangements within the processing block 20 to enable the instruction word to address a register in each of the two sets of 16 in the block 230 are modified according to the function specified in field 44 of the instruction word 40. Thus, where a function is specified that requires this form of addressing, the decoder 224 in conjunction with the control unit 226 recognises this fact and the addressing made for the register block 230 is modified from the form used in a "MASKED READ" instruction as illustrated. In practice, the two fields 41 and 43 (FIGS. 1 and 2) of the instruction word both have connections within the cable 196 for addressing the register block 230. In the case of the MASKED READ instruction illustrated, only the five bits of the field 43 are effective to specify a "one-out-of-thirty-two" selection for the register block 230 address and it will be realised that the most significant of these bits actually selects one of the two sets of sixteen registers within the block 230, the actual register of the set to be selected being specified by the remaining four bits of the field 43. Because, in the case of the instruction words now to be considered, each register set is to be addressed separately, then only four bits are needed to specify a register within the set. Thus for these instruction words the two fields 41 and 43 may both be considered as having four bits each. The field 43 then specifies a single register in one set and the field 41 is, under these circumstances considered to be a four-bit field specifying the address of a register in the other set, the control unit, in response to the appropriate decoded function, controlling the necessary gating arrangements to permit this change in addressing mode to the register block 230. At the same time, of course, the connections in cable 114 from the field 41 to the input multiplexors 101–120 are disabled. It is convenient, in the case where the function to be performed requires the result of the logic operation to be re-entered into a register instead of being passed as an output from the processing block, to require that one of the selected registers continues to be addressed to receive the result from the buffer 252 via the multiplexor 205 over the line 207. For this purpose the decoding of the function field of the various instruction words is arranged so that the multiplexor 205 is rendered operative to apply result signals to that register in the blodk 230 having a predetermined one of the addresses specified by the fields 41 and 43.

It will also be understood that other instruction words from the program memory 210 may, of course, supply data either to a register via the multiplexor 205, or to one of the multiplexors 234 and 235. In the latter case, a source register for the other of the multiplexors 234 and 235 can be specified which register may also serve as a destination for the function result in similar manner to that mentioned above. The setting of markers may also be accomplished by further instructions especially in order to cater for jumps.

The output 254 from the processing block 20 will carry a 12-bit word. This is represented at 50 in a similar manner to the representation at 40 of an input instruction word. In particular, the word is shown divided into three parts or fields 51, 52 and 53 each of which is shown as having four bits. The reason for this division will appear from consideration of the organisation of the output block 30 (FIG. 3). It is assumed that 64 outputs are to be served and these are controlled in 16 groups. Corresponding groups 301 to 316, each of four bistable devices, are shown for exercising output control according to their states. Only one group 310, of bistable devices is shown in detail. Each bistable device has two complementarily energised outputs in each stable state to which it is set according to which of two inputs was last energised.

Associated with each output group are two sets 340 and 380 of gating arrangements. One of these sets, 380, serves to establish an energisation pattern for a selected group and the other, 340, serves to mask out any desired one or more of the output bistable devices of that group so that its state remains unaltered regardless of the energisation pattern. The three parts 51, 52 and 53 of the output word 50 are repeated, for clarity, in FIG. 3, and serve to (a) select one of the sixteen outputs groups, (b) mask the selected group, and (c) define an energisation pattern, respectively.

The first output word part 51 is fed over cable 317 to a binary to one-out-of-16 converter 320 having 16 outputs 321 and 336. A different one of these outputs 321 to 336 is energised for each possible energisation combination of its four inputs from cable 317. The converter output 330 corresponding to the output group 310 is shown extending to the corresponding one, 350, of the gating arrangements 341 to 356 making up the masking set 340. Each of the masking gating arrangements, e.g., 350 comprises four two-input AND gates 361 to 364. One output of all of these four gates is connected, via a line, 365, unique to that gating arrangement, to be energised in an enabling sense for the gate concerned by the corresponding output, 330, of the converter 320. The other inputs of the gates, 361 to 364 are each connected to a different one of lines 366 to 369, respectively, which are connected to be energised according to different bits of the output word part 52 as indicated by cable 370 and lines 371 to 374. The lines 366 to 369 extend, in similar manner, to all of the gating arrangements 341 to 356. In operation, the digits of the output word part 52 will cause, via line 366 to 369, enablement of the same specified ones of each of the gating arrangements 341 to 356, via their AND gate second inputs. One output only of the converter 320 will be energised to enable AND gates, so that only one gating arrangement, e.g., 350, will have its AND gate first inputs enabled. Only the specified one of the AND gates of that arrangement will have its second input enabled, so that only one of the gate arrangement outputs, e.g., 375 to 378, will be energised.

The output lines of each of the gating arrangements 341 to 356 are connected as inputs to a corresponding one of the gating arrangements 381 to 396 of the set 380.

Considering the arrangement 390 corresponding to that, 350, described in detail for the masking set 340, each of the lines 375 to 378 is connected to one input of each of a pair of two-input AND gates 401 and 402, 403 and 404, 405 and and 406, 407 and 408, respectively. A first gate 401, 403, 405, 407 of each of these pairs of AND gates has its other input connected to a different one of the lines 411 to 414.

The second gate, 402, 404, 406, 408 of each AND gate pair also has its other input connected to the lines 411 to 414, respectively, but via inverters indicated by bars in FIG. 3. In this way, the other inputs of the AND gates of each pair will, when energised, carry complementary signals. In effect, this ensures that one or the other of the AND gate outputs 421 and 422, 423 and 424, 425 and 426, 427 and 428 of each pair will be energised if the first inputs are energised by the outputs of the masking set.

As shown, the lines 411 to 414 are connected via the lines 415 to 418, respectively, and cable 420 to be energised according to different bits of the output word part 53. Furthermore, the lines 411 to 414 extend to, and are similarly connected within, all of the gating arrangements 341 to 356.

In operation, the bits of the third part 53 of an output word 50 specify, via lines 411 to 414, the same particular AND gate output energisation pattern for each of the gating arrangements 381 to 396.

This pattern will only occur in its entirety if a gating arrangement 381 to 396 has all its input from the corresponding one of the mask gating arrangements 341 to 356 energised in an enabling sense. In fact, only one of the gating arrangements 341 to 356 will have any of its outputs so energised and those that are so energised will be specified by the output word part 52. Only for those AND gate pairs corresponding to the selected marking gating arrangement will parts of the energisation pattern permit an output line pair energisation from a gating arrangement 381 to 396.

Each pair of outputs from one of the pattern gating arrangements 381 to 396 is connected to the inputs of a unique bistable output device whose outputs control a particular parameter of the peripheral machine to be controlled. As previously mentioned, the bistable devices are arranged in groups of four, 301 to 316. The group 310, corresponding to the gating arrangement 390 is shown in greater detail. It includes four bistable devices 431 to 434 having pairs of inputs connected to the pattern output line pairs and pair of outputs 441 and 442, 443 and 444, 445 and 446, 447 and 448, respectively.

The output block 30 of FIG. 3, is thus operative, in accordance with a single 12-bit output word, to (a) select a particular predetermined group of four of 64 output line pairs to be controlled, (b) specify an energisation pattern for the four output line pairs of the selected group, and (c) ensure that the pre-existing energisation is unchanged for those lines which have been so masked that they are inhibited from inclusion in a final selection of lines within the selected group.

Clearly, the logic of the output block 30 could be very different and still obtain the same result. For example, the various gate output energisations could be reversed by using further inverters. Also, a masking set 340 of gating arrangements might succeed, rather than precede, the energisation pattern set 380.

There is no particular significance in the described use of 12-bit data words. A larger machine could clearly utilise longer data words. Equally, smaller words can be used. The particular described embodiment is, in fact, readily amendable to modular construction using four-bit modules.

Also, the number of inputs and outputs can be different so long as the unavoidable time penalty is acceptable, the number of inputs or outputs served can be greater than the actual number provided if one or more of the groups are used for giving access to multiplexed additional inputs or outputs.

If the control of more than one peripheral machine at a time is contemplated, it may be that some input multiplexors will be incorporated in the machines to be controlled along with output bistable devices that may be necessary for control of the input multiplexors. More than one level of multiplexing may be provided for in such applications.

We claim:

1. In a data processing system in which items of data are required to be applied through peripheral data handling units, at least one peripheral unit function control device including:

- groups of input lines arranged to carry input information;
- groups of output lines;
- control word storage registers arranged in at least two groups;
- means for storing instruction words;
- means for reading out instruction words in succession from the instruction storing means, the instruction words read out specifying functional linkages required to be set up between input and output lines;
- means responsive to a first portion of a first instruction word to select one of the groups of input lines and to mask input lines of the selected group to render effective only some of the lines of that group to pass information;
- means responsive to a second portion of said first instruction word to select a word storage register in one of said groups to receive information from the effective ones of the masked input lines;
- control means responsive to the second and a third portion of a following instruction word to read the received information from the selected word storage register and to read out other information from a word storage register of a different group and to combine logically said contents of the word registers read out to produce a resultant multi-digit output control word; and
- means responsive to the output control word to energise with an output signal pattern a plurality of selected ones of the output line groups, the energisation pattern being related to the digits of the output control word.

2. Apparatus as claimed in claim 1 further including a buffer register connected to receive the output control word from the logical combining means; and means for retransferring the output control word from the buffer register into one of the word storage registers read out in response to said second instruction.

* * * * *